No. 783,858. PATENTED FEB. 28, 1905.
A. FREY.
PNEUMATIC TIRE.
APPLICATION FILED SEPT. 12, 1904.
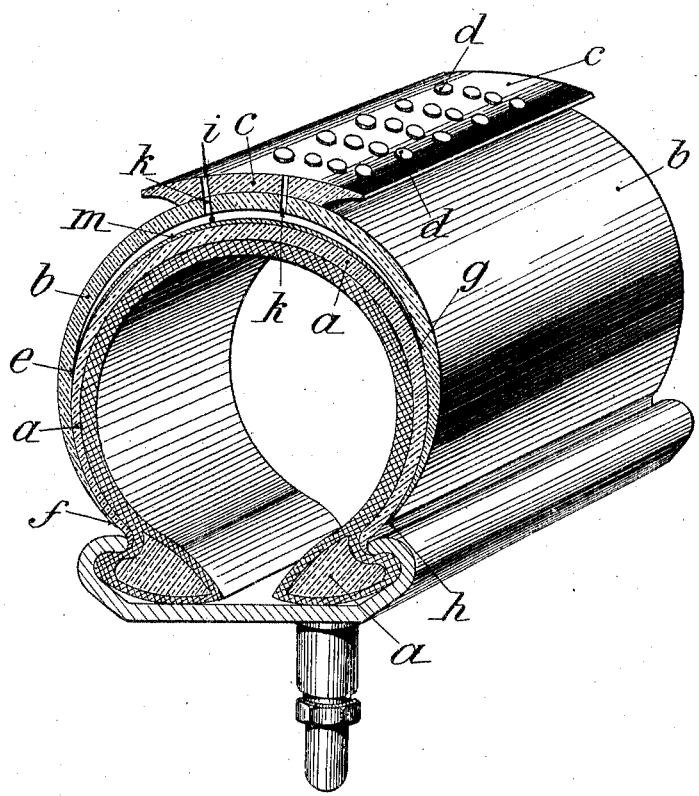
Witnesses.
F. O. Parker
Robert Everett
Inventor
Alfred Frey.
By James F. Norris
Atty.

No. 783,858.

Patented February 28, 1905.

UNITED STATES PATENT OFFICE.

ALFRED FREY, OF PARIS, FRANCE, ASSIGNOR TO SOCIÉTÉ ANONYME DES PNEUMATIQUES CUIR SAMSON, OF PARIS, FRANCE.

PNEUMATIC TIRE.

SPECIFICATION forming part of Letters Patent No. 783,858, dated February 28, 1905.

Application filed September 12, 1904. Serial No. 224,194.

*To all whom it may concern:*

Be it known that I, ALFRED FREY, engineer, a citizen of France, residing at Paris, France, have invented certain new and useful Improvements in Pneumatic Tires, of which the following is a specification.

The present invention has for its object a non-slipping or antiskidding band for pneumatic tires characterized by the fact that it is furnished internally with an air-space or air-gap designed to suppress the heating caused while traveling at high speeds by reason of the friction of the cover on the ground.

The greater part of the non-slipping tires at present in use are shod or faced with pieces of iron in order to render them non-slipping, and these systems all present the great inconvenience that they become heated by reason of the friction of the iron pieces or studs upon the ground. This heating, which may become very considerable at high speeds, is transmitted by the iron studs to the interior of the tire and sets up bursting of the air tubes or chambers by reason of the excessive expansion of the air compressed therein.

The non-slipping or non-skidding tires made according to this invention obviate this inconvenience, and consequently give very great security.

The annexed drawing is a perspective view, partly in transverse section.

$a$ represents the body of an ordinary pneumatic tire of commerce.

$b$ represents a leather protecting-cover faced with a wearing band or tread $c$. This band is flexible and is furnished with steel studs or rivets $d$, which also extend through the cover $b$. Certain arrangements of this kind are at present known; but in all of them the cover $b$ is solutioned (or fastened in any other suitable manner) all over the exterior of the tire $a$. Now according to the present invention the cover $b$ is only fixed or solutioned to the tire by its external edges—for example, at the parts from $e$ to $f$ and $g$ to $h$—so that the part which has the largest diameter—that is to say, the part from $e$ to $g$—is not fastened or solutioned on. This latter part of the cover is thus kept absolutely free or "floating," as it were, so that there exists between it and the part $a$ an empty space, which may have a depth of some few millimeters. In this manner there is thus constantly a cushion of air interposed between the exterior of the tire $a$ and the inner part of the cover $b$. This cushion isolates the line of rivets or studs $d$ from the tire $a$, and thus prevents or hinders the transmission of the heat to the interior of the tire. As the studded portion of the cover is kept separate or floating, it consequently results that at any particular portion of the tire $a$ the lines of rivets do not always come exactly on the same spot every time that the portion in question touches the ground. This fact tends to increase the difficulty of the transmission of the heat to the interior.

If it be desired to still further insure the isolation by causing the renewal or change of the air contained in the empty space $i$, this may be done by piercing at intervals suitable vent-holes $k$, which put the intermediate cushion of air into communication with the atmosphere. The diameter of these vent-holes should be large enough to allow the air to pass and yet small enough to prevent the entry of gravel or grit. Moreover, the pressure which is set up in the space $i$ by the deformation of the tire, due to the rolling or traveling, is sufficient to keep the vent-holes $k$ constantly open and clear. Finally, to protect the portion $a$ against the action of the row of studs or rivets $d$ an intermediate strip of leather solutioned onto the said portion may be interposed, as shown at $m$, the edges of this leather band being gradually tapered or beveled off in order not to cover the adjacent canvas.

I claim—

1. In a pneumatic tire, a protecting-cover secured thereto so as to leave an air-space between the same and the said tire, a flexible band forming a tread carried by the said cover, said band and cover provided with openings communicating with the air-space, and metal reinforcements on the said band.

2. In a pneumatic tire having a spaced cover forming an annular air-chamber therebetween, and a flexible band reinforcing the tread of the cover, said cover provided with openings in communication with the air-chamber, and means carried by the said band for reinforcing the same.

3. In a pneumatic tire, a perforated protecting-cover, of a band secured thereto forming a thickened tread, said cover arranged to leave an air-chamber between the same and the said tire, and a plurality of projections on said band.

In testimony whereof I have hereunto set my hand in presence of two subscribing witnesses.

ALFRED FREY.

Witnesses:
 HANSON C. COXE,
 LEVI ZANFFRET.